UNITED STATES PATENT OFFICE.

GEORGE ARCHBOLD, OF NEW YORK, N. Y., ASSIGNOR TO HIRAM GILBERT BOND, OF SAME PLACE.

PROCESS OF REFINING IRON.

SPECIFICATION forming part of Letters Patent No. 414,134, dated October 29, 1889.

Application filed September 20, 1889. Serial No. 324,564. (No specimens.)

*To all whom it may concern:*

Be it known that I, GEORGE ARCHBOLD, a subject of the Queen of Great Britain, and a resident of the city, county, and State of New York, have invented certain new and useful Improvements in the Process of Refining Iron, of which the following is a specification.

My invention has for its object the elimination of phosphorus or phosphorus and sulphur from iron, either in the process of smelting the ore or in the refining of the crude or pig iron, and converting it into malleable iron and steel.

In my prior applications, numbered 321,769 and 321,770, I have described and claimed a method of eliminating phosphorus or phosphorus and sulphur from iron by subjecting the molten metal to the action of the salts of barium, and I have described how, under certain circumstances in such treatment of the metal, cyanide of barium is formed in the process resulting from the introduction of the carbonate of barium or other salts; and my present invention consists in introducing into the molten metal previously-prepared cyanide of barium.

In carrying out the invention I subject the molten mass of metal, either in the blast-furnace, cupola, ladle, converter, or other receptacle, to the action of cyanide of barium, and this may be accomplished in any of the usual ways—as by blowing it through the tuyeres or other convenient manner—the object being to bring the cyanide of barium into close contact with the molten mass, preferably at the time it is heated to such a degree that the cyanide will readily liberate the phosphorus and sulphur, and these, combined with barium, will pass off in the waste products. At the melting-point of iron the phosphorus and sulphur are contained therein in the form of phosphide of iron and sulphide of iron, and the introduction of the cyanide of barium results in freeing the mass of phosphorus and sulphur. The barium cyanide at the temperature of the molten metal is decomposed, and a portion of the cyanogen liberates the phosphorus, which unites with the baryta, forming the phosphide of barium and a small amount of the ferro-cyanide of iron, which latter in its turn is decomposed into a refractory carbide of iron, and passes off in the slag. The proportion of cyanide of barium to be used can readily be determined by knowing the analysis of the iron and the coke or other ingredients. In this way I am enabled to reduce or refine iron high in phosphorus and convert it into iron or steel having the qualities of iron or steel low in phosphorus.

What I claim is—

The method, substantially as herein described, of eliminating the phosphorus or phosphorus and sulphur from iron, which consists in treating it in the presence of the cyanide of barium.

In testimony whereof I have signed my name to this specification in the presence of two subscribing witnesses.

GEORGE ARCHBOLD.

Witnesses:
J. S. BARKER,
F. L. FREEMAN.